United States Patent
Poulsen et al.

(10) Patent No.: US 6,631,339 B2
(45) Date of Patent: Oct. 7, 2003

(54) DATA PATH EVALUATION SYSTEM AND METHOD

(75) Inventors: Steven P. Poulsen, East Amherst, NY (US); Joseph S. Ott, Depew, NY (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 09/834,016

(22) Filed: Apr. 12, 2001

(65) Prior Publication Data

US 2002/0183952 A1 Dec. 5, 2002

(51) Int. Cl.[7] .................... G01R 27/28; G01R 31/00
(52) U.S. Cl. ................ 702/117; 702/58; 379/15.01; 379/22.01; 375/224
(58) Field of Search .................. 702/57–59, 66, 702/69–72, 112–121, 182, 189; 379/1.02, 9, 14, 18.01, 22.01, 22.02; 375/224, 226, 227; 324/523, 612, 76.11, 76.47, 76.55, 76.77; 725/107

(56) References Cited

U.S. PATENT DOCUMENTS

| | | | | |
|---|---|---|---|---|
| 3,920,973 A | * | 11/1975 | Avellar et al. | 702/58 |
| 3,978,282 A | * | 8/1976 | Fulton, Jr. | 178/69 G |
| 4,791,357 A | * | 12/1988 | Hyduke | 324/73.1 |
| 5,224,149 A | * | 6/1993 | Garcia | 379/22.01 |
| 5,784,406 A | * | 7/1998 | DeJaco et al. | 375/224 |

FOREIGN PATENT DOCUMENTS

JP          10011895 A   *  1/1998  ........... G11B/20/10

* cited by examiner

*Primary Examiner*—Marc S. Hoff
*Assistant Examiner*—Manuel L. Barbee
(74) *Attorney, Agent, or Firm*—Blakely, Sokoloff, Taylor & Zafman LLP

(57) ABSTRACT

A data path evaluation system and method is described wherein the data path can be a voice signal path and the reference signal can contain white gaussian noise.

33 Claims, 4 Drawing Sheets

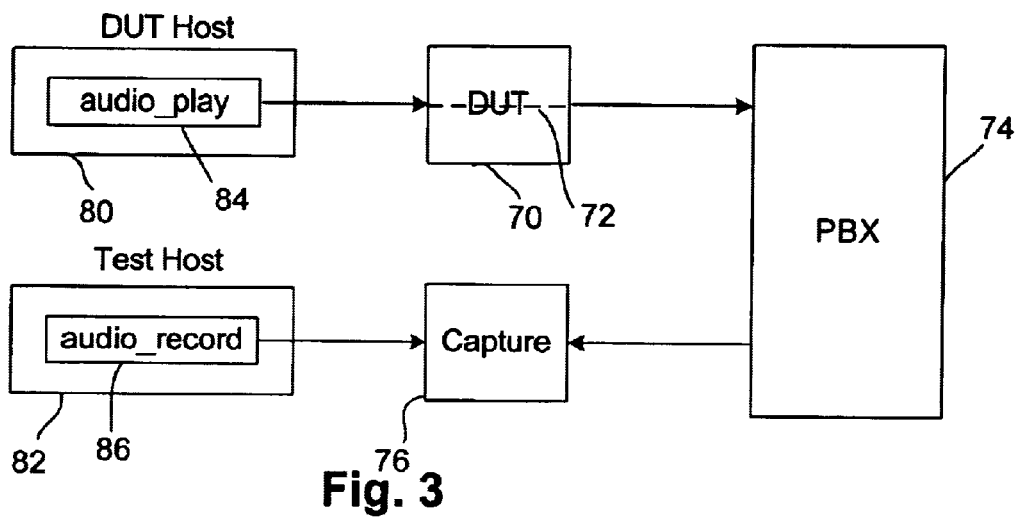
Fig. 3
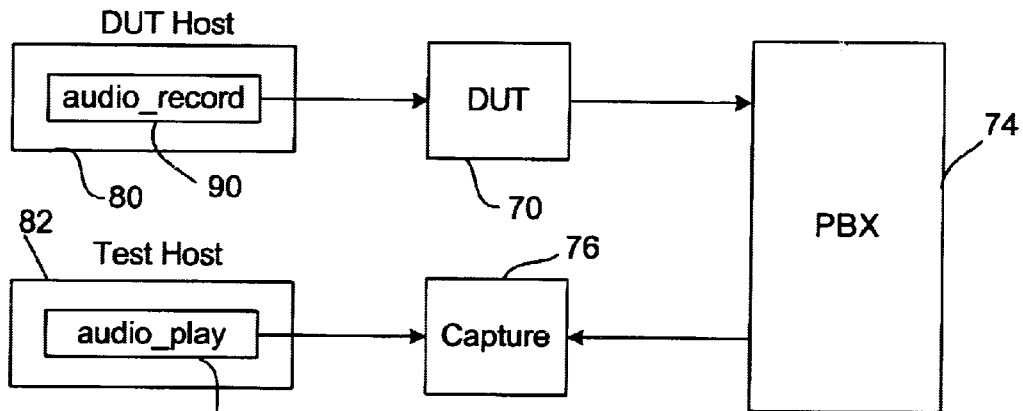
Fig. 4
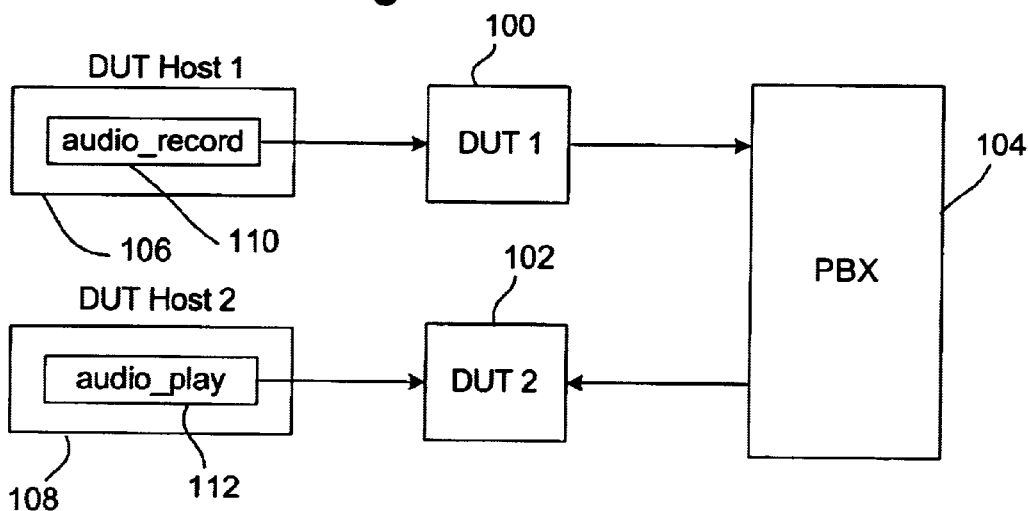
Fig. 5 Dual DUT Setup

DATA PATH EVALUATION SYSTEM AND METHOD

BACKGROUND

This embodiment of the invention relates to evaluation of data paths in devices, and more particularly to evaluation of voice data paths in telephony network devices.

As new hardware designs are implemented, both in data processing networks in general and in telephony voice processing networks in particular, it is important to be able to validate the reliability and integrity of the data path. In digital telephone emulation systems a significant portion of the hardware front-end is dedicated to handling the voice data path. With the high complexity of such hardware, the likelihood of loss of signal integrity is increased. Generally, a listening test does not provide enough information to validate the reliability and integrity of this path. Errors in this processing may go undetected by typical subjective audio quality tests. In addition, a listening test rarely provides information to what the source of a problem may be.

Therefore, it would be highly desirable to quantitatively evaluate the hardware design in a manner which enables identification of the source of the problems.

BRIEF DESCRIPTION OF THE DRAWING FIGURES

FIGS. 3 and 4 are block diagrams illustrating an alternative form of a data path evaluation system according to one embodiment of the invention;

FIG. 5 is a block diagram illustrating another alternative form of a data path evaluation system according to one embodiment of the invention;

DETAILED DESCRIPTION

Figure 1:
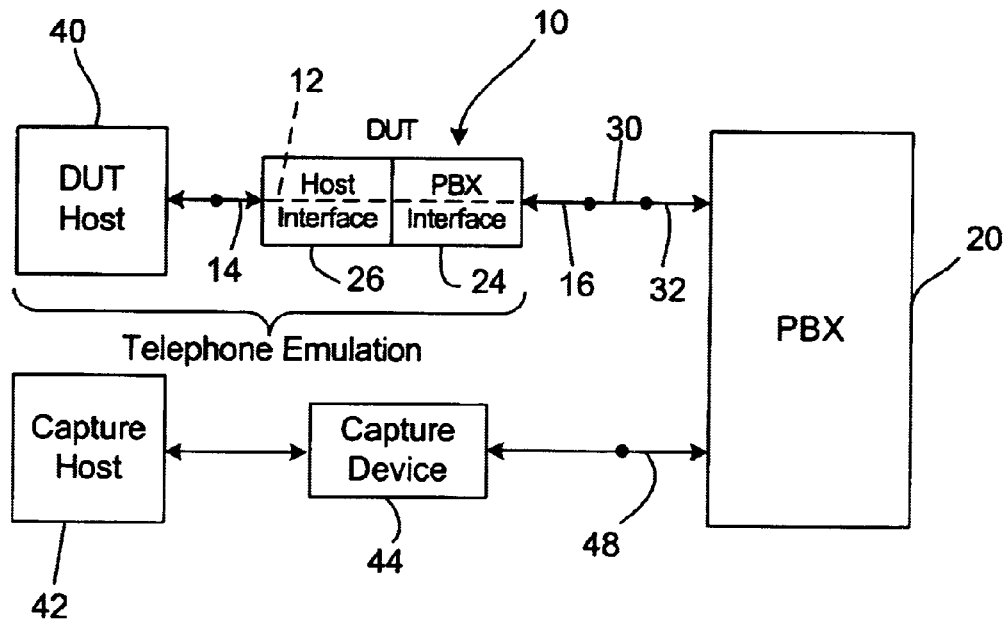
FIG. 1 is a block diagram of a general form of a data path evaluation system according to one embodiment of the invention.

FIG. 1 shows a general form of the data path evaluation system according to the invention. A device under test 10 (DUT) has a data path or channel 12 therethrough which may have two ends. Device 10 also may have a plurality of ports, two of which are designated 14 and 16 in FIG. 1. The system of FIG. 1 also includes a device 20 to provide a signal path of the type to which the DUT 10 will be operatively coupled during use. In a telephony application, device 20 can comprise a telephone switch such as a private branch exchange (PBX). In a telephony emulation application, device under test 10 is the front end hardware having a PBX interface portion 24 and a system interface portion 26. Port 16 of DUT 10 may be connected via a signal path 30 to port 32 of device 20. Device 20, of course, may have other forms such as the Internet or any device providing an appropriate signal transmission path or channel.

The data path evaluation system of FIG. 1 further comprises a host arrangement to provide a test signal and to define play and record paths. In the system shown, the host arrangement may include the combination of a device under test host (DUT Host) 40, a test or captive host 42 and a test or captive device 44. The DUT Host 40 may be a personal computer or an embedded processor. The test host 42 in the system shown may be a separate host, although as will be shown presently it may be the DUT Host. The test or captive device 44 may be the same device as DUT 10, an additional device similar to DUT 10 or another device that interfaces to PBX 20 and that can capture voice signals and put voice signal patterns on the line. An example of the latter is the voice product commercially available from the Voice Technologies Group division of Dialogic Corporation under the trademark iPOD. In a manual rather than automated approach, host 40 and device 44 could even be the combination of a scope and a signal generator and vice-versa. The DUT Host 40 may be connected to port 14 of DUT 10. Test host 42 and capture device 44 may be operatively connected as shown, and capture device 44 may be connected to port 48 of PBX 20.

The data path evaluation system and method evaluates a device under test based on captured data at both the input and output of the device while the device is not in normal service. This data is captured for two cases in order to test both the transmit hardware and the receive hardware. The evaluation applies signal processing algorithms on the audio samples, as will be described in detail presently, in order to provide objective results. Thus, in the arrangement of FIG. 1, once a test connection is established, the setup should have the ability to record voice signals from both sides of DUT 10 as well as to play voice signals from both sides of DUT 10.

It may be desirable to have access to the data at points adjacent both ends of DUT 10. However, for physical accessibility reasons, this may sometimes be difficult to obtain. Additionally, it is ideal if the path through device 20 does not affect the voice data. Again, this may not always be the case. In particular, when device 20 is a PBX the signal transmission path will have some acceptable amount of distortion or degradation. For these reasons, the tests must be able to allow for that amount of degradation. In other words, the tests should not interpret this amount of degradation as being unacceptable. The test device 44 and test host 42 may be used in order to capture the data while host 40 generates the data, and their roles may be reversed. Any equipment that can perform this same function may replace these.

The tests carried out using the system and method make the following assumptions. The foregoing acceptable amount of distortion provided by PBX 20 may consist of DC offsets and AC gains with small amounts of noise, filtering, or other disturbances. The PBX 20 must pass data through such that audio quality degradation is minimal. The algorithms should handle any distortion that the PBX 20 adds. Additional devices, such as voice processing boards, which are in or connected to the test setup, pass the data through either unmodified, or with typical 300 to 3000 Hz filtering.

Several alternatives are available for data collection. These may be target dependent. One method is to use the computer file containing the test signal exactly as is for the source. However, this may not be ideal since the data may get changed before it is presented to the input of DUT 10. Another method would be to capture the data at the input of DUT 10, using a logic analyzer. A logic analyzer is a device designed to capture patterns of data or voice signals. This method provides a good data source, however it may require custom setup of the logic analyzer, which is system dependent.

The sink or DUT output may be captured in ways much like the source. One option is to capture the data through the PC, i.e., DUT Host 40, and some sort of record operation. Again there could be some difference between the captured data computer file and the DUT output that does not get accounted for. The advantage with this method is the ease of implementation. The other methods of capturing directly on the DUT output are equivalent to the source capture methods of DUT input.

Figure 2:
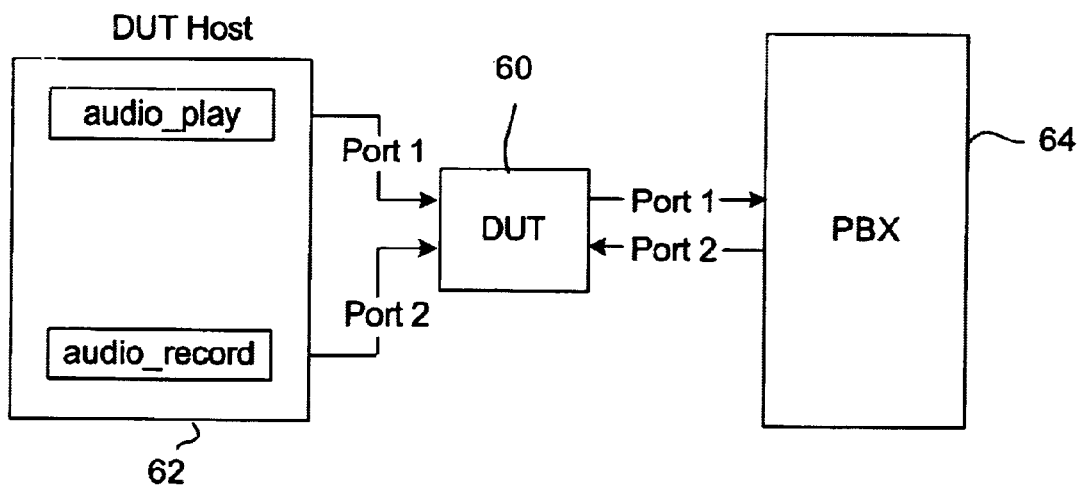
FIG. 2 is a block diagram of a data path evaluation system according to one embodiment of the invention.

An example of a setup of these tests is shown in FIG. 2. This setup assumes a multi-port DUT 60 that is capable of making a connection from one port to another. In this setup, an audio computer file may be played on the first port while being recorded on the second port. The computer files may be compared directly on the DUT Host 62. The ports of DUT 60 may be connected to DUT Host 62 and to PBX 64 as shown.

In cases where the setup of FIG. 2 cannot be used, the arrangement of FIGS. 3 and 4 provides an alternative. The device under test (DUT) 70 has a data path 72 therethrough, PBX 74 is similar to PBX 20 of FIG. 1 and PBX 64 of FIG. 2, and capture device 76 is a device that interfaces to PBX 74 and that can capture voice signals and put voice signal patterns on the line. An example of device 76 is the voice product commercially available from Voice Technologies Group division of Dialogic Corporation under the trademark iPOD. DUT host 80 may be a personal computer or an embedded processor. Test host 82 may be a separate host and likewise may be a personal computer or embedded processor.

FIG. 3 illustrates a sink setup wherein capture device 76 may be used to record from DUT 70. In this setup, DUT host 80 may provide a play signal function 84 and test host 82 may provide a record signal function 86. FIG. 4 illustrates a source set up wherein capture device 76 is used to play into DUT 70. In this setup, DUT host 80 may provide a record signal function 90 and test host 82 may provide a play signal function 92. In both setups, the computer files containing the voice signals of interest may be collected on either DUT host 80 or test host 82.

The setup of FIGS. 3 and 4 also may be used in situations where the data path passes through the transmit and receive of the device under test and it is desired to isolate these paths in order to track down a problem.

The setup of FIGS. 3 and 4 requires connecting a capture device like device 76 to the same PBX as the device under test. For cases where connecting a capture device like device 76 to the same PBX as the DUT is not possible, the setup of FIG. 5 provides an alternative. In this setup, the two DUTs 100 and 102 may be used to perform the test. Both DUTs 100 and 102 are identical and are connected to PBX 104. Identical DUT hosts 106 and 108 are provided and connected to the DUTs 100 and 102, respectively. DUT hosts 106 and 108 may be personal computers or embedded processors. DUT host 106 may provide a record signal function 110 and DUT host 108 may provide a play signal function 112.

Evaluation of the voice data path requires that two samples of audio be obtained. A source signal should be played into one end of the data path and then recorded at the other end. The formats of the computer files containing the signals should be similar and should represent what is seen at the endpoints of the DUT as best as possible. The source signal should be white gaussian noise (WGN) where the length of the computer file is much greater than the expected time between errors. A WGN signal is chosen such that it can properly be aligned. The standard deviation of the signal should be set to ½ of the maximum single-ended range. Also, any random values that fall outside the maximum signal range should not clipped, but rather, regenerated until they fall inside the allowed range. Finally, the recording should be started before the source signal is played and stopped after the source signal is stopped. It is also advantageous if the source computer file hits all possible values of data at least once.

This test may be used in order to capture errors of the following types: random bit errors, data dependant bit errors, lost samples, repeated samples, synchronization problems (data shifted). This test may be designed to catch errors that are difficult to capture because of their uncommon occurrence.

Once the signals are acquired, they may be presented to the analysis system and method illustrated in FIG. 6 which contains several algorithms which will be described. Inputs to the system 120 shown in FIG. 6 may be the reference signal on path 122 and the captured signal on path 124. The system 120 may include an alignment stage 130, followed by an optional automatic gain control stage 132, then an optional filter compensation stage 134, followed by a normalization stage 136 and finally a comparison stage 138. The output of comparison stage 138 either may be returned via a path 140 to alignment stage 130 for a purpose to be described, or it may be input to a stage 142 for utilizing the result of the comparison.

Turning first to the alignment stage 130, it performs the first operation in the process which is to align the signals. Since a WGN signal was used as a source, this operation may be performed by a correlation. The correlation may be performed by taking a block of the source signal and sliding it across the captured signal. The source block that is used is the first block of the source file that contains significant power. By significant power is meant power that exceeds or distinguishes from background noise. This block may be correlated against the captured signal and the result saved in an array. In addition, the energy of the source signal block may be computed as well as the energy of the overlapping part of the captured signal. Next, the array may be searched in order to find the maximum value. The index of this value may be used to adjust the captured signal such that it aligns properly with the source block. An additional check is to make sure that when the foregoing maximum value is squared, it is very close to the product of the two energies computed for the blocks of the correlation input. This ensures that a true match has been found.

Figure 7:
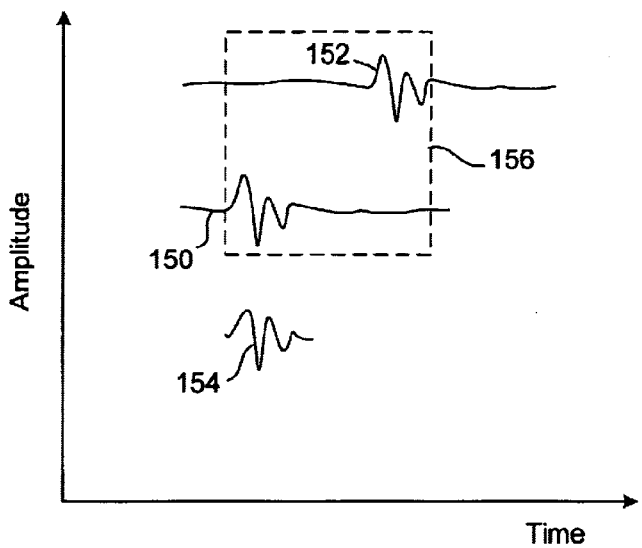
FIG. 7 is a graph including waveforms further illustrating the alignment stage in a method according to one embodiment of the invention.

The foregoing is illustrated in further detail as follows. The source and captured signals are represented by the waveforms 150 and 152, respectively, in FIG. 7. The correlation with the captured signal is performed by taking the first block of significant power of the source signal. This is represented by the waveform 154 in FIG. 7. The next operation is taking the same block in time of the captured signal 152. That block is represented by the rectangle 156 in FIG. 7. For each sample in the source signal ($s[i]$) and captured signal ($c[i]$) the following product sum is obtained:

$$y = \sum_{i=1}^{n} s[i] \cdot c[i]$$

where N is the block length, i.e. the length of rectangle 156 in FIG. 7. The value of the product sum is stored in an array:

$$y[j] = y$$

The foregoing operations are repeated for a shifted version of the captured signal. Thus, the rectangle 156 would be shifted slightly to the right as viewed in FIG. 7, but this is only for the captured signal, the same block being used. This would be represented by the following:

$$y[j] = \sum_{i=j}^{j+n-1} s[i] \cdot c[i]$$

for all j (1 through the length of the source) which means:

$$y[1] = \sum_{i=1}^{n} s[i] \cdot c[i]$$

$$y[2] = \sum_{i=1}^{n} s[i] \cdot c[i+1]$$

and so on, i.e. y[1], y[2], y[3] etc. to the end of the file containing the signal.

The next operation is to use the array y[j] and find the maximum value where j is 1 through L, where L is the length of the signal (the length of the file containing the signal). For example, if the maximum y[j] is at y[55] then the index of the maximum is 55. The location of the maximum is the location of the best fit.

Finally, taking the maximum index the source signal is shifted to the left as viewed in FIG. 7 by the number of samples equal to the maximum index. This means the first x samples are discarded:

$$s[j] = s[j+x]$$

where x is the maximum index and for all j from 1 to L where L is the length of the file containing the signal. The signals now are aligned.

The next stage in system 120 is the automatic gain control (AGC) stage 132 wherein AGC may be optionally compensated for by removing a fixed amount of data from the beginning of each computer file containing the reference and captured signals. This allows the system time to adjust the gain, without substantially affecting the comparison.

An optional filter compensation may be performed in stage 134 if the audio path is known to contain filtering. The two signals are used to feed a channel estimator, beginning at the alignment point. The channel estimator provides a model of the channel in the form of a channel filter. The resulting channel filter is then applied to the source signal. Thus, as shown in FIG. 6, the filter component of stage 134 is variable and controlled by the equalization component. This compensation may cause some types of analog errors to go undetected. These analog errors are specifically defined as circuit errors that affect the audio filtering. Errors in the analog portion of the digital modulation still will be detected.

Figure 8A:
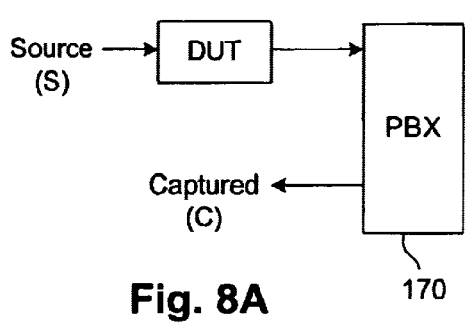
FIGS. 8A and 8B are schematic block diagrams further illustrating a filter compensation stage in a method according to one embodiment of the invention.

Thus, the operation in stage 134 may be viewed as finding the "filter" which was applied to the captured signal so it can be applied to the reference signal to provide the compensation. Since the transmitted signal, i.e. the source or reference signal, may be filtered by the PBX 170 shown in FIG. 8A, the captured signal is then a filtered version of the source:

$$c = f(s)$$

where f(s) is a filter applied to s.

Figure 8B:
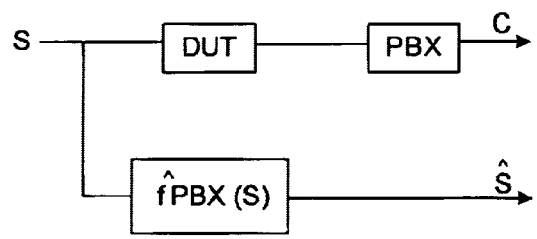

Before a comparison of the reference (source) and captured signals is performed it may be desirable to filter the source signal s by the same filter. This is illustrated in FIG. 8B where $f_{PBX}(s)$ is a filtering of the source (reference) signal s using an estimated filter. Stage 134 compensates this way, in order to ignore differences due to "allowed" filtering. The function $f_{PBX}(\ )$ is estimated using c, s and the well known least means squares (LMS) algorithm.

After the signals have been aligned, they should be normalized in order to remove any gain and bias that the system may have added. Normalization is performed in stage 136. The method is to use linear estimation in order to find the most likely system gain and bias. These estimates may be used to adjust the captured signal. This method assumes constant gains and DC offsets over the entire length of the captured signal.

In particular, in order to compensate for a gain and DC offset the source signal is normalized by:

$$S_{new} = A \cdot C + B$$

Optimal linearization shows that A and B are optimally given by:

$$A = \frac{\overline{SC} - \overline{S}\,\overline{C}}{\overline{SS} - \overline{S}\,\overline{S}} \quad B = \overline{C} - A\overline{s}$$

where s=source signal and c=captured signal and $$\bar{s} = \sum_{i=1}^{L} \frac{Si}{L}$$

which is the mean of s $$\bar{c} = \text{mean of } c$$

$$\overline{sc} = \sum_{i=1}^{L} \frac{SiCi}{L}$$

mean of the product $$\bar{s}\,\bar{c} = \left(\sum_{i=1}^{L} \frac{Si}{L}\right)\left(\sum_{i=1}^{L} \frac{Ci}{L}\right)$$

product of the mean
where L is the length over which the averaging occurs which in this case is the length of the file containing the signal.

The signals may then be compared in stage 138 and if the difference falls outside some tolerable range, an error may be declared. Once an error is found, a re-alignment may be performed via path 140. This may be accomplished by correlating a source block of length equal to the length where the differences are out of range, up to some maximum. This block is correlated until a maximum correlation is found. Then the signal alignment is adjusted and the algorithm continues. Errors are flagged for later evaluation.

After all errors are found, they may be individually evaluated. All errors are evaluated by using the alignments before and after the error. If the alignments are the same, it is called sample errors. Otherwise, the difference in alignment is reported as samples missed or added.

Figure 6:
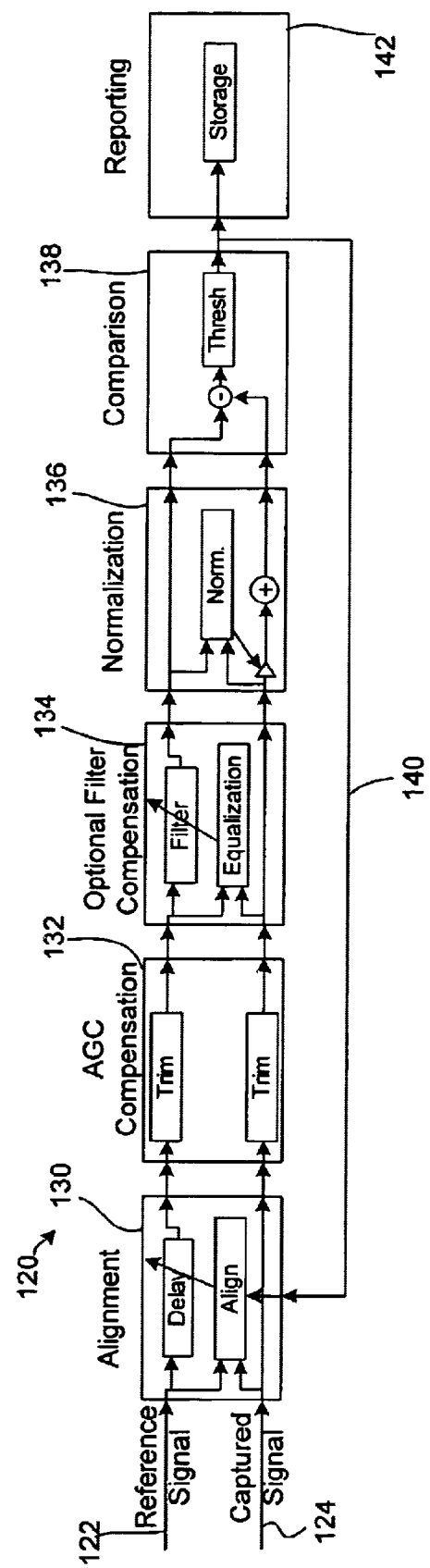
FIG. 6 is a block diagram illustrating a data path evaluation method according to one embodiment of the invention.

The system and method of FIG. 6 may be in the form of software run on a PC which can be in the DUT host. Alternatively, it may be run on a software layer in a section of the DUT which is not being tested. The software may be in the form of a program of instructions to evaluate the data path, and the program may be embodied in a program storage device readable by a machine such as the foregoing PC or section of the DUT host and which instructions are executable by the machine.

While embodiments of the invention have been described in detail, that is done for the purpose of illustration, not limitation.

What is claimed is:

1. A method comprising:
   transmitting a white Gaussian noise (WGN) source signal over a data path to a device under test (DUT);
   capturing a signal output from the DUT over the data path;
   aligning the captured signal with the source signal; and
   comparing the aligned captured signal to the source signal to determine if the signals differ.

2. The method of claim 1, wherein transmitting the WGN source signal comprises transmitting a WGN audio source file, the source file a length of time greater than an expected length of time between errors in the captured signal.

3. The method of claim 2, wherein transmitting over the data path comprises transmitting over a voice signal path.

4. The method of claim 1, wherein transmitting the source signal and capturing the signal output from the DUT comprises a single host device operatively coupled with the DUT transmitting the source signal and capturing the output signal.

5. The method of claim 1, wherein transmitting the source signal comprises a transmit host operatively coupled with the DUT transmitting the source signal, and wherein capturing the signal output from the DUT comprises a capture host operatively coupled with a data path simulating device capturing the output signal, the data path simulating device connected to the DUT.

6. The method of claim 1, wherein aligning the captured signal with the source signal comprises performing a correlation function on the captured signal.

7. The method of claim 1, wherein comparing the aligned captured signal to the source signal further comprises normalizing the aligned signals.

8. The method of claim 1, further comprising repeating aligning the captured signal with the source signal and comparing the realigned captured signal with the source signal, if the aligned captured signal differs from the source signal by a threshold.

9. The method of claim 1, further comprising modifying the source signal to adjust for expected filtering the DUT will apply to the output signal that is captured.

10. The method of claim 9, wherein modifying the source signal to adjust for expected filtering comprises modifying the source signal by an estimate of signal processing expected to be applied by the DUT to the output signal.

11. An article of manufacture comprising a machine-accessible medium having content that when accessed provides instructions to cause a machine to:
   transmit a white Gaussian noise (WGN) source signal over a data path to a device under test (DUT);
   capture a signal output from the DUT over the data path;
   align the captured signal with the source signal; and
   compare the aligned captured signal to the source signal.

12. The article of manufacture of claim 11, wherein the content to provide instructions to cause the machine to transmit the WGN source signal comprises the content to provide instructions to cause the machine to transmit a WGN audio source file, the source file a length of time greater than an expected length of time between errors in the captured signal.

13. The article of manufacture of claim 11, wherein the content to provide instructions to cause the machine to transmit over the data path comprises the content to provide instructions to cause the machine to transmit over a voice signal path.

14. The article of manufacture of claim 11, wherein the content to provide instructions to cause the machine to transmit the source signal and capture the signal output from the DUT comprises the content to cause a single host device operatively coupled with the DUT to transmit the source signal and capture the output signal.

15. The article of manufacture of claim 11, wherein the content to provide instructions to cause the machine to transmit the source signal comprises the content to provide instructions to cause a transmit host operatively coupled with the DUT transmitting the source signal to transmit the source signal, and wherein the content to provide instructions to cause the machine to capture the signal output from the DUT comprises the content to provide instructions to cause a capture host operatively coupled with a data path simulating device to capture the output signal, the data path simulating device connected to the DUT.

16. The article of manufacture of claim 11, wherein the content to provide instructions to cause the machine to align the captured signal with the source signal comprises the content to provide instructions to cause the machine to perform a correlation function on the captured signal.

17. The article of manufacture of claim 11, wherein the content to provide instructions to cause the machine to compare the captured signal to the source signal to determine if the signals differ further comprises the content to provide instructions to normalize the aligned signals.

18. The article of manufacture of claim 11, further comprising the content to provide instructions to cause the machine to repeat aligning the captured signal with the source signal and comparing the realigned captured signal with the source signal, if the aligned captured signal differs from the source signal by a threshold.

19. The article of manufacture of claim 11, further comprising the content to provide instructions to cause the machine to modify the source signal to adjust for expected filtering the DUT will apply to the output signal that is captured.

20. The article of manufacture of claim 19, wherein the content to provide instructions to modify the source signal to adjust for expected filtering comprises the content to provide instructions to cause the machine to modify the source signal by an estimate of signal processing expected to be applied by the DUT to the output signal.

21. A system comprising:
   a source host to transmit a white Gaussian noise (WGN) source signal over a data path to a device under test (DUT);
   a capture host to capture a signal output from the DUT over the data path; and a processor communicatively coupled with the source host and the capture host to align the captured signal with the source signal and compare the aligned captured signal to the source signal.

22. The system of claim 21, wherein the source host comprises a processor, and the capture host comprises a processor coupled with a capture device.

23. The system of claim 22, wherein the source host and the capture host comprise a single device coupled with the DUT.

24. The system of claim 22, wherein the capture device comprises an additional device under test (DUT).

25. The system of claim 24, wherein the source host functions as a capture host for the additional DUT, and the capture host functions as a source host for the additional DUT.

26. The system of claim 21, wherein the source host transmits the source signal over a voice signal path.

27. The system of claim 21, further comprising a data path simulating device connected to the DUT.

28. The system of claim 27, wherein the data path simulating device comprises a device to which the DUT is to be connected in regular, non-testing operation.

29. The system of claim 21, wherein the processor aligns the captured signal with the source signal by performing a correlation function on the captured signal.

30. The system of claim 21, further comprising the processor to normalize the aligned signals.

31. The system of claim 21, further comprising the processor to repeat aligning the captured signal with the source signal and to compare the captured signal with the source signal, if the captured signal differs from the source signal by a threshold.

32. The system of claim 21, further comprising the processor to process the source signal to adjust for expected filtering the DUT will apply to the output signal that is captured.

33. The system of claim 32, wherein the processor processes the source signal by applying a signal processing routine that is an estimate of processing expected to be applied by the DUT to the output signal.

* * * * *